(12) United States Patent
Fagerlund et al.

(45) Date of Patent: Nov. 3, 2009
(10) Patent No.: US 7,613,211 B1

(54) DIGITAL CLOCK SMOOTHING APPARATUS AND METHOD

(75) Inventors: Richard John Fagerlund, San Jose, CA (US); James P. Flynn, Palo Alto, CA (US); Mark Fong, San Jose, CA (US); David Bruce Isaksen, Mountain View, CA (US)

(73) Assignee: Wideband Semiconductors, Inc., Mountain View, CA (US)

( * ) Notice: Subject to any disclaimer, the term of this patent is extended or adjusted under 35 U.S.C. 154(b) by 587 days.

(21) Appl. No.: 11/357,685

(22) Filed: Feb. 18, 2006

(51) Int. Cl.
*H04J 3/06* (2006.01)
*H04L 7/00* (2006.01)

(52) U.S. Cl. ...................... 370/504; 375/372
(58) Field of Classification Search .......... 370/342, 370/503, 504, 505; 375/363, 372; 386/13; 710/57
See application file for complete search history.

(56) References Cited

U.S. PATENT DOCUMENTS

| | | | | |
|---|---|---|---|---|
| 4,596,026 A | * | 6/1986 | Cease et al. | 375/372 |
| 6,381,659 B2 | * | 4/2002 | Proch et al. | 710/57 |
| 6,501,809 B1 | * | 12/2002 | Monk et al. | 375/363 |
| 6,714,717 B1 | * | 3/2004 | Lowe et al. | 386/13 |

* cited by examiner

*Primary Examiner*—Ayaz R Sheikh
*Assistant Examiner*—Hai-Chang Hsiung
(74) *Attorney, Agent, or Firm*—Boris G. Tankhilevich

(57) ABSTRACT

A method for digital clock smoothing comprising: (A) inputting an asynchronous data stream having an asynchronous symbol rate into a two-port memory block; (B) accumulating a plurality of symbols of the asynchronous data stream in the two-port memory block for a predetermined time period; (C) computing an average symbol rate for the input asynchronous data stream; (D) generating a clock error signal equal to the difference between the average symbol rate of the input asynchronous data stream and a nominal output synchronous clock; (E) obtaining a smoothed symbol rate clock by using the error clock signal; and (F) generating an output smoothed data stream having the smoothed symbol rate clock.

15 Claims, 5 Drawing Sheets

DIGITAL CLOCK SMOOTHING APPARATUS AND METHOD

TECHNICAL FIELD

The present invention relates to a digital signal processing (DSP), and more specifically, to a digital clock smoothing apparatus and method.

BACKGROUND ART

A continuous receiver can only be utilized where generally continuous communications (as opposed to burst communications as in the present invention) are performed, so as to substantially maintain timing synchronization between the transmitter and the receiver which is necessary for proper reception of the communicated information. During continuous communications, timing recovery is a more straightforward process since signal acquisition generally only occurs at the initiation of such communications. Thus, acquisition is generally only performed in continuous receivers once per continuous transmission and each continuous transmission may be very long.

On the other hand, the burst communications (for instance, for TDMA systems) require periodic and frequent reacquisition of the signal. That is, during TDMA communications, the signal must be reacquired for each separate burst transmission being received.

DISCLOSURE OF THE INVENTION

The present invention provides a method and an apparatus for direct digital synthesis that is configured to regenerate digital clock during the blank time periods existing between the time periods of recovery of burst signals.

One aspect of the present invention is directed to a method for digital clock smoothing.

In one embodiment, the method of the present invention comprises: (A) inputting an asynchronous data stream having an asynchronous symbol rate into a two-port memory block; (B) accumulating a plurality of symbols of the asynchronous data stream in the two-port memory block for a predetermined time period; (C) computing an average symbol rate for the input asynchronous data stream; (D) generating a clock error signal equal to the difference between the average symbol rate of the input asynchronous data stream and a nominal output synchronous clock; (E) obtaining a smoothed symbol rate clock by using the error clock signal; and (F) generating an output smoothed data stream having the smoothed symbol rate clock.

In one embodiment, the method of the present invention comprises: (A) inputting an asynchronous data stream having an asynchronous symbol rate into a FIFO two-port memory block; (B) storing each input symbol in the FIFO under control of an input FIFO address control register; (C) obtaining a smoothed symbol rate; and (D) reading out each output symbol from the FIFO under control of an output FIFO address control register at the smoothed symbol rate.

In one embodiment of the present invention, the step (B) further comprises: (B1) obtaining the FIFO depth B by subtracting modulo B the symbol output address from the symbol input address for each stored symbol; (B2) inputting the FIFO depth B into a programmable look-up table (LUT); (B3) obtaining a phase detector error signal; (B4) scaling the phase detector error signal in order to obtain a scaled error factor, wherein the scaled error factor is normalized by using a set of parameters selected from the group consisting of: {a ratio of the input symbol rate to the reference clock; and a damping factor configured to compensate for latency of the frequency lock loop (FLL)}; and (B5) adding the scaled error factor to a nominal phase step to obtain a phase update.

In one embodiment of the present invention, the step (B1) further comprises: (B1, 1) gray-coding an output FIFO read address; (B1, 2) synchronizing an output count for each FIFO read-out symbol from the gray-coded output FIFO read address with the input asynchronous clock; (B1, 3) inversely gray-coding the synchronized gray-coded output FIFO read address; and (B1, 4) obtaining a current FIFO depth by subtracting by modulo B the synchronized output FIFO read address obtained in the step (B1, 3) from the current input FIFO write address; wherein B comprises the FIFO depth.

In one embodiment of the present invention, the step (B2) further comprises: (B2, 1) programming the LUT by using a set of parameters selected from the group consisting of: {an error limit; and a hysteresis}.

In one embodiment of the present invention, the step (B3) further comprises: (B3, 1) programming the phase detector by installing the programmable LUT.

In one embodiment of the present invention, the step (C) further comprises: (C1) multiplying the phase update by factor i/N by using an N stage wide phase accumulator; wherein the N stage wide phase accumulator is configured to output a set of N phase updates; i being an integer less or equal to N; N being an integer; (C2) applying each i-th phase update to i-th cosine look-up table (COS_LUT); wherein an N-stage cosine look-up table (N_COS_LUT) is configured to generate a set of N phase outputs; and (C3) applying each N phase output generated by the N-stage cosine look-up table (N_COS_LUT) to a Digital-to-Analog Converter (DAC); wherein the DAC is configured to generate a plurality of uniformly spread time epochs including a plurality of odd time epochs and a plurality of even time epochs; N being a ratio of the DAC sampling clock and the clock smoothing rate.

Another aspect of the present invention is directed to an apparatus for digital clock smoothing.

In one embodiment, the apparatus of the present invention comprises: (A) a means for inputting an asynchronous data stream having an asynchronous symbol rate; (B) a means for storing each input symbol; (C) a means for obtaining a smoothed symbol rate; and (D) a means for outputting each symbol at the smoothed symbol rate.

In one embodiment of the present invention, the means (A) further comprises: a FIFO means (A1) configured to input the asynchronous data stream having an asynchronous symbol rate.

In one embodiment of the present invention, the means (B) further comprises: a means (B1) for obtaining the FIFO depth B by subtracting modulo B for each stored symbol the symbol output address from the symbol input address; (B2) a programmable LUT configured to input the FIFO depth B; (B3) a phase detector configured to obtain a phase detector error signal; (B4) a means for scaling the phase detector error signal to obtain a scaled error factor, wherein the scaled error factor is normalized by using a set of parameters selected from the group consisting of: {a ratio of the input symbol rate to the reference clock; and a damping factor configured to compensate for latency of the frequency lock loop (FLL)}; and (B5) a means for adding the scaled error factor to a nominal phase step to obtain a phase update.

In one embodiment of the present invention, the means (B1) further comprises: (B1, 1) a means for gray-coding an output FIFO read address; (B1, 2) a means for synchronizing an output count for each FIFO read-out symbol from the gray-coded output FIFO read address with the input asynchronous clock; (B1, 3) a means for inversely gray-coding the synchronized gray-coded output FIFO read address; and (B1, 4) a means for subtracting by modulo B the synchronized output FIFO read address obtained in the step (B1,3) from the current input FIFO write address to obtain a current FIFO depth; wherein B comprises the FIFO depth.

In one embodiment of the present invention, the means (B1, 1) further comprises: (B1, 1, 1) a first gray-coding LUT configured to gray-code the output FIFO read address.

In one embodiment of the present invention, the means (B1, 2) further comprises: (B1, 2, 1) a serial Flip-Flops operated by the input asynchronous input clock signal, wherein the serial Flip-Flops is configured to synchronize the output count for each FIFO read-out symbol from the gray-coded output FIFO read address with the input asynchronous clock.

In one embodiment of the present invention, the means (B1, 3) further comprises: (B1, 3, 1) a second gray-coding LUT configured to inversely gray-code the synchronized gray-coded output FIFO read address.

In one embodiment of the present invention, the means (B2) further comprises: (B2, 1) a means for programming the LUT by using a set of parameters selected from the group consisting of: {an error limit; and a hysteresis}.

In one embodiment of the present invention, the means (B3) further comprises: (B3, 1) a means for programming the phase detector by installing the programmable LUT.

In one embodiment of the present invention, the means (B4) further comprises: (B4, 1) a scale value register configured to determine a scale factor; and (B4, 2) a scale error register configured to scale the phase detector error signal by using the scale factor to obtain a scaled error factor.

In one embodiment of the present invention, the means (B5) further comprises: (B5, 1) an adder configured to add the scaled error factor to the nominal phase step to obtain the phase update.

In one embodiment of the present invention, the means (C) for obtaining the smoothed symbol rate further comprises: (C1) a means for multiplying the phase update by factor i/N by using an N stage wide phase accumulator; wherein the N stage wide phase accumulator is configured to output a set of N phase updates; i being an integer less or equal to N; N being an integer; (C2) a means for applying each i-th phase update to i-th cosine look-up table (COS_LUT); wherein an N-stage cosine look-up table (N_COS_LUT) is configured to generate a set of N phase outputs; and (C3) a means for applying each N phase output generated by the N-stage cosine look-up table (N_COS_LUT) to a Digital-to-Analog Converter (DAC); wherein the DAC is configured to generate a plurality of uniformly spread time epochs including a plurality of odd time epochs and a plurality of even time epochs; N being a ratio of the DAC sampling clock and the clock smoothing rate.

Other advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Figure 1A:
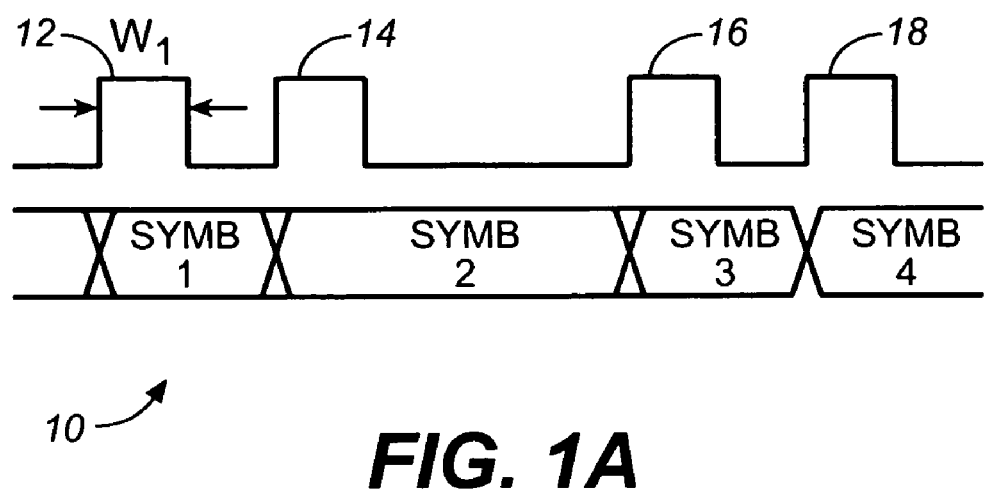
FIG. 1A depicts first several symbols of an asynchronous input burst signal for the purposes of the present invention.

Reference now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific-details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a digital signal processing system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accumulating", "computing", "generating", "obtaining", "calculating", "determining", communicating", or the like, refer to the actions and processes of a digital signal processor, or similar electronic communication and/or computing device. The digital signal processor, or similar electronic communication and/or computing device manipulates and transforms data represented as physical (electronic) quantities within the system's registers and memories into other data similarly represented as physical quantities within the system memories or registers or other such information storage, transmission, or display devices.

The demodulator's smoothing circuit of the present invention is designed to eliminate the burst nature of symbol recovery in the all digital demodulator that results in a 50% duty cycle clock that tracks the actual baud rate of the transmitted signal.

Figure 1B:
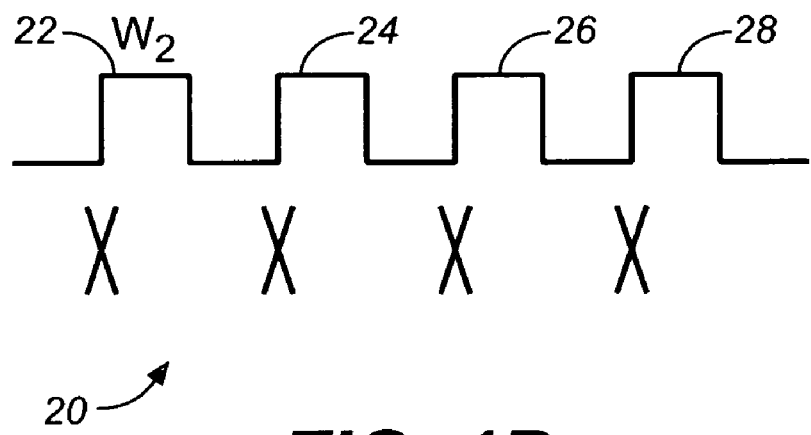
FIG. 1B illustrates first several symbols of smoothed burst signal of FIG. 1A comprising an output synchronous signal for the purposes of the present invention.

In one embodiment of the present invention, FIG. 1A depicts first several symbols 12, 14, 16, and 18 of an asynchronous input burst signal 10. FIG. 1B depicts an output synchronous signal 20 having first several symbols 22, 24, 26, and 28. Thus, the input asynchronous signal 10 is smoothed by the demodulator's smoothing circuit of the present invention and is transformed into the synchronous output signal 20. Please, see discussion below.

Figure 2:
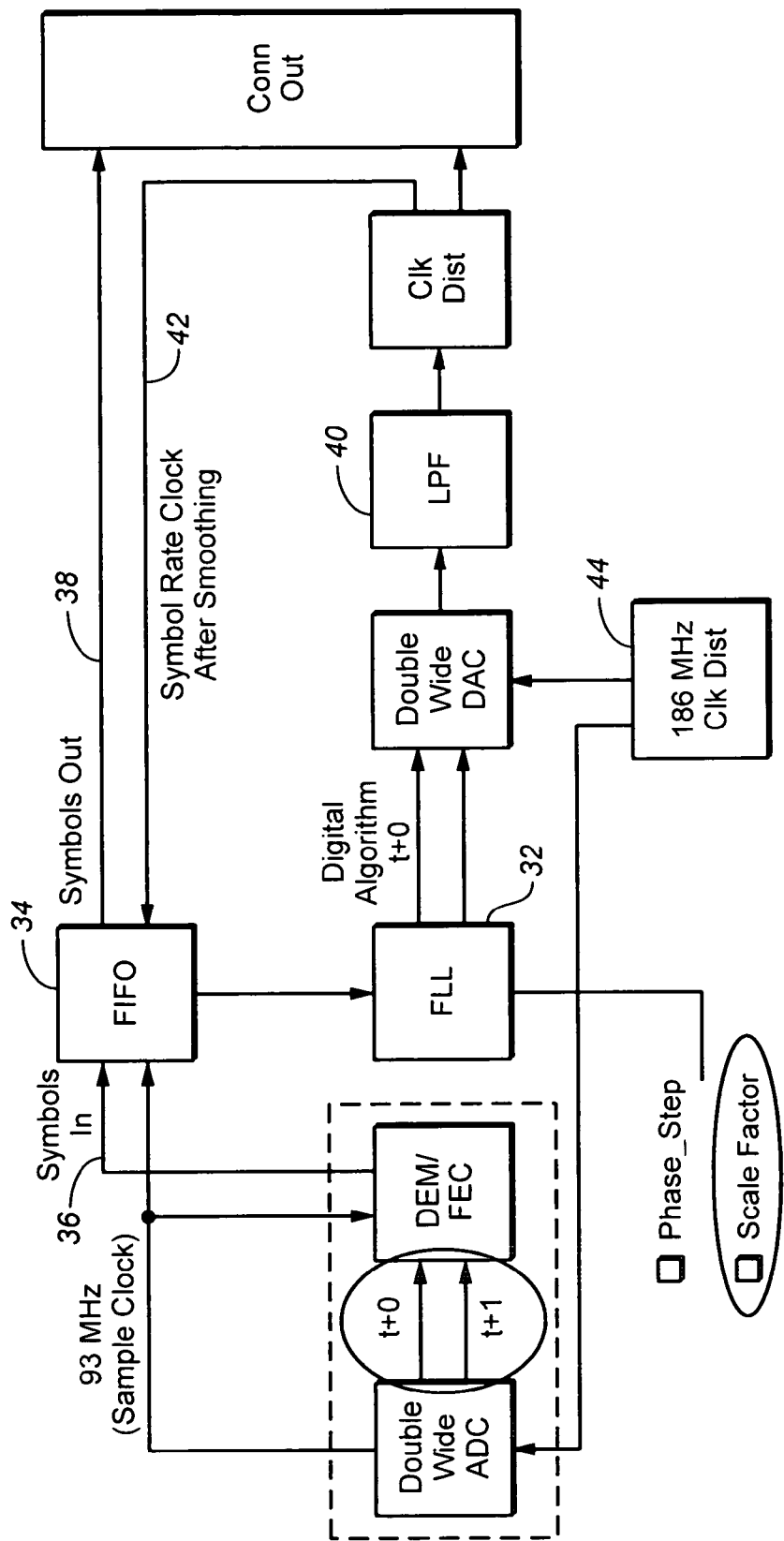
FIG. 2 shows the basic design of the demodulator's smoothing circuit of the present invention.

In one embodiment, FIG. 2 shows the basic design 30 of the demodulator's smoothing circuit of the present invention comprising the frequency lock loop (FLL) block 32 that is configured to implement the digital algorithm of the present invention. Block 32 of FIG. 2 comprises frequency lock loop (FLL) further comprising the phase detector error generator (not shown). Please, see discussion below.

In one embodiment of the present invention, referring still to FIG. 2, the FIFO 34 represents a 2-port memory device. Each input symbol 36 is stored in a register (not shown) having an input address (not shown), whereas each output symbol 38 is read out from a register (not shown) having an output address (not shown).

To obtain an accurate count of symbols within the FIFO across the asynchronous clock domains (input vs. output clock), the output address is subtracted from the input address modulo B, where B is the FIFO depth. In one embodiment of the present invention, B=4096 as shown in FIG. 3B. In obtaining an output address of the register the output symbol is read out from, the output address from the FIFO is gray-coded, synchronized (through serial FIFO's operated by the input clock), and inversely gray-coded (not shown). This sequence of operations causes the output count to be accurate to +1 symbol due to the nature of gray-coding in which only a single bit changes with each address change.

Figure 3A:
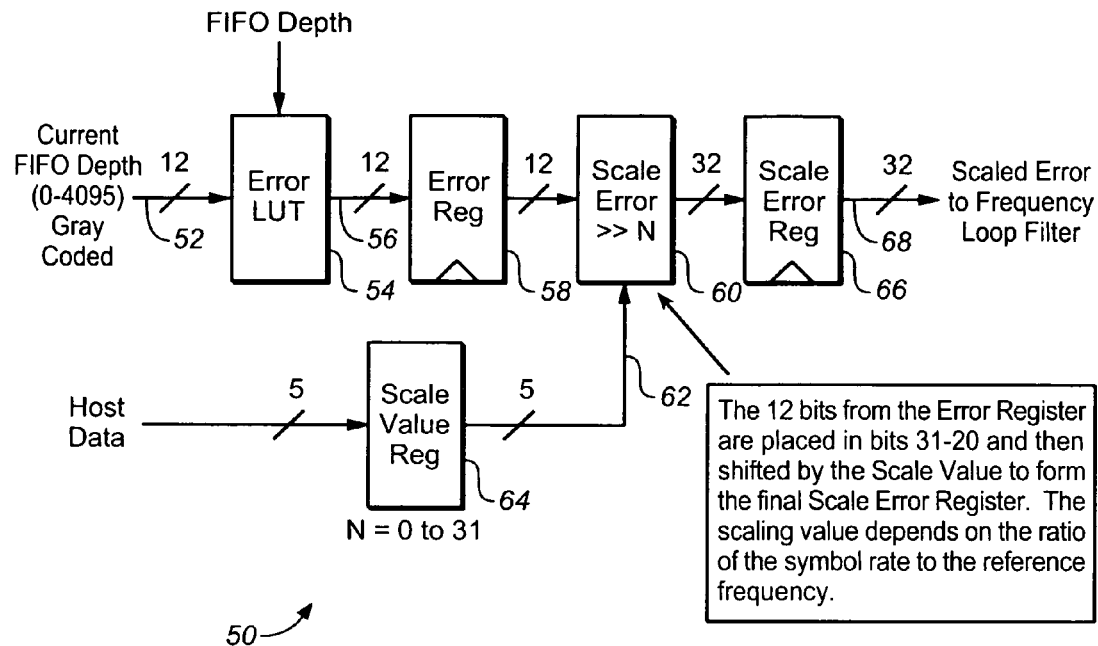
FIG. 3A depicts the error generator of the present invention in more details.
Figure 3B:
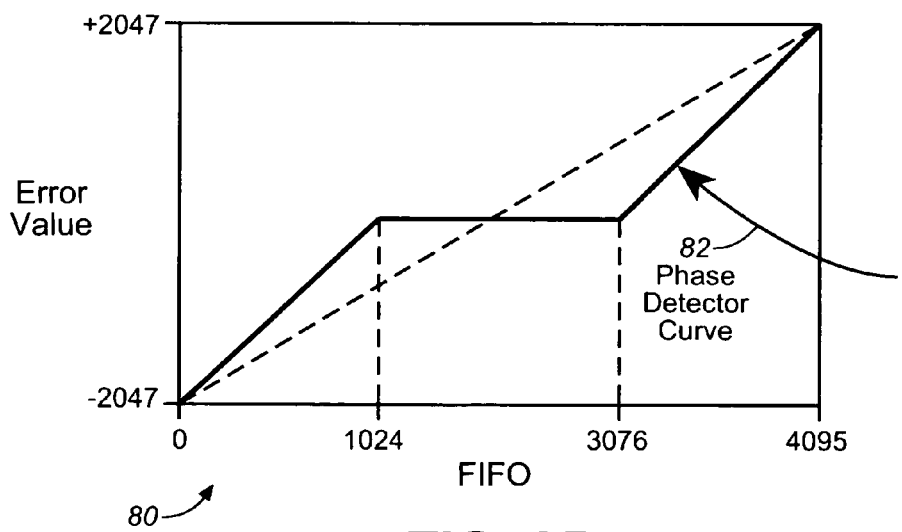
FIG. 3B illustrates the Phase Detector curve installed in the error look-up table (Error-LUT) for the purposes of the present invention.

In one embodiment of the present invention, the phase detector error generator 50 is depicted in FIG. 3A in more details.

The error generator 50 gets the current gray-coded FIFO depth (34 of FIG. 2) (12 bits) and performs a look-up table operation via Error-LUT 54 to get the error value 56 (12 bits) based on the installed Phase Detector curve (82 of FIG. 3B). The Phase Detector curve (82 of FIG. 3B) installed in the Error-LUT 54 is programmable so that the error limit and hysterisis can be configured for various operational modes.

In one embodiment of the present invention, referring still to FIG. 3A, the 12 bits error value 56 is stored in the Error Register 58. The 12 bits from the Error Register 58 are placed in bits 31-20 and then shifted by the scaling value 62 (5 bits) (stored in the Scale value Register 64) to form the final Scale Error Register 66 (32 bits).

In one embodiment of the present invention, referring still to FIG. 3A, the output of from the Error Register 58 is scaled to normalize it to the symbol rate and damping factor being used.

In one embodiment of the present invention, the stored error value (12 bits) is further scaled by a binary power of 2 to compensate for the different baud rates (actually byte rates). If the binary power of 2 is in the range (0 to 10) for the scaling purposes, the actual scaling factor is in the range (1 to 1024). If one can make the range from 0 to 31 a 5-bit value will allow a complete 32-bit shift.

In one embodiment of the present invention, the scaling shifts are implemented by using a barrel shifter, i.e., a conditional shift by 16, followed by a conditional shift by 8, . . . , followed by a conditional shift of 1. The 12-bit error value starts in bit positions 31-20 with zero padding in positions 19-0.

The scaling value 62 depends on the ratio of the symbol rate to the reference frequency. The scaled error 68 (32 bits) is further processed by the Loop Filter (LPF) 40 (of FIG. 2).

Figure 4:
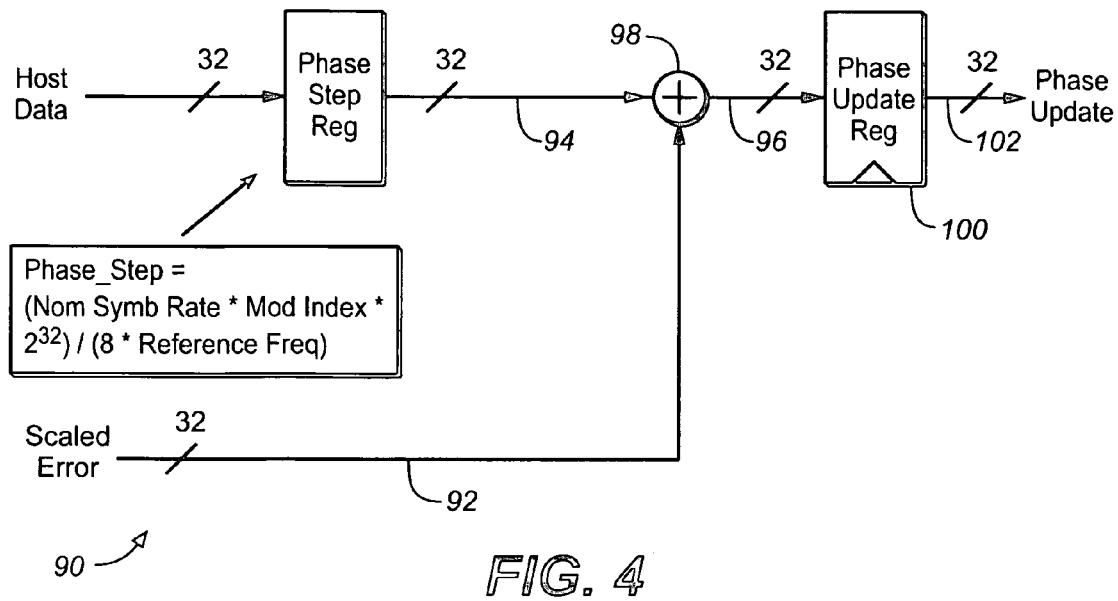
FIG. 4 shows the phase update block for the purposes of the present invention.

In one embodiment of the present invention, the phase update block 90 is shown in FIG. 4. The scaled error factor 90 (having 32 bits) is added to the nominal phase step 94 (having 32 bits) (nominal symbol rate output) in the adder block 98 to obtain the phase update 96 (having 32 bits). The phase update 96 is stored in the Phase update Register 100. The phase update 102 is read out from the Phase update Register 100.

Figure 5:
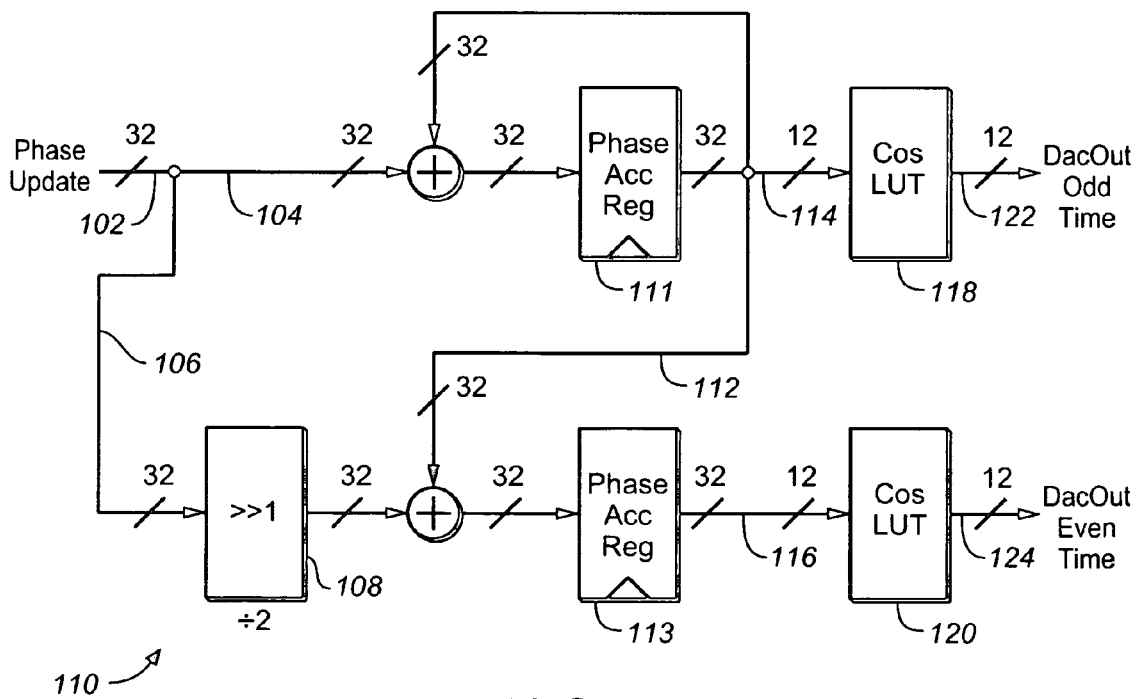
FIG. 5 illustrates the two-stage phase accumulator for the purposes of the present invention.

In one embodiment of the present invention, the two-stage phase accumulator 110 is depicted in FIG. 5. The two-stage phase accumulator 110 comprises the phase accumulator register 111 in the first stage and the phase accumulator register 113 in the second stage. The phase update 102 is further multiplied by the factor ½ in the block 108 in the second stage and is added in the adder block 110 to the output 112 from the first stage phase accumulator 111. For each stage of the phase accumulator, the Most Significant Bits (MSBs) (114 for the first stage and 116 for the second stage) are used as inputs to Cosine LUT (118 for the first stage and 120 for the second stage) to obtain the next Direct Digital Synthesis (DDS) clock input values 122 (for odd times) and 124 (for even times) for that phase.

Figure 6:
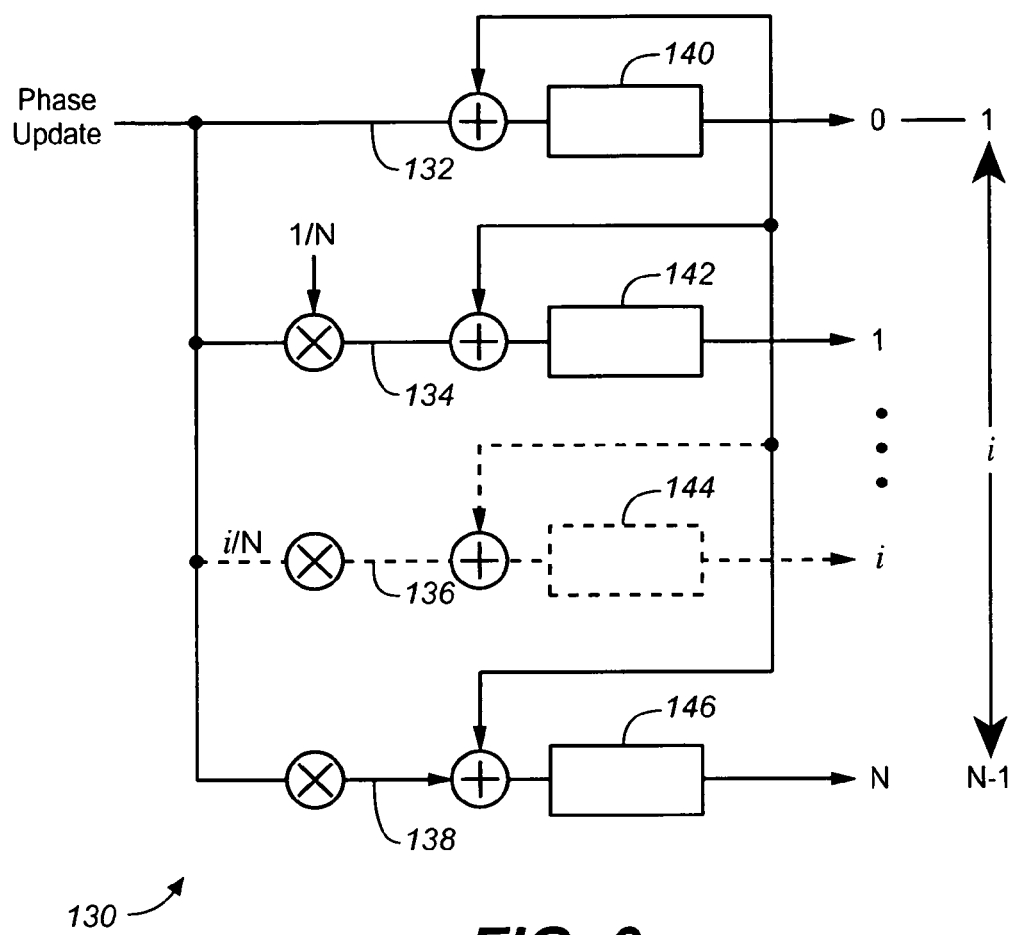
FIG. 6 depicts the N-stage phase accumulator for the purposes of the present invention.

In one embodiment of the present invention, the N-stage phase accumulator 130 is depicted in FIG. 6. The N-stage phase accumulator 130 comprises the first phase accumulator register 140 in the first stage, the second phase accumulator register 142 in the second stage, the i-stage phase accumulator 144 in the i-th stage, and the N-th phase accumulator register 146 in the last N-th stage. In each stage, the phase update is further multiplied by the factor i/N (only shifts required for power of 2 numbers of accumulators) and is added to the i-th accumulator for all i-th stage phase accumulators, integer "i" is equal to or less than N. The N-stage phase accumulator 130 outputs N different phase outputs which allows one to update DDS that accepts N phase inputs where N is the ratio of the DDS clock and the clock rate of the smoothing circuit. For each stage, the phase accumulator's MSBs are used as the input to Cosine LUT (not shown) to obtain the next DDS input value for that phase.

Referring still to FIG. 2, the DDS output 42 is used as the symbol rate clock after smoothing. This is the synchronous symbol rate at which the symbols 38 are read out from the FIFO block 34.

Example

To compute the smoothing circuit values the following procedure is followed assuming a 186.667 MHz reference frequency (block 44 of FIG. 2).

A. Phase Step.

The phase step is the value that sets the nominal frequency (natural frequency) out of the smoothing loop assuming no frequency updates. This frequency is computed as follows:

Phase Step=(Nominal Symbol Rate*Modulation Index*$2^{32}$)/(Reference Frequency*8). (Eq. 1)

The phase step given by (Eq. 1) can be computed for different types of QAM modulations.

For BPSK modulation, whereas the modulation index is 1, and where the symbol rate is in MHz, (Eq. 1) can be re-written as follows:

$$\text{Phase Step} = (\text{Nominal Symbol Rate}/186.667) * 0.125 * 2^{32}. \quad \text{(Eq. 2)}$$

For QPSK modulation, whereas the modulation index is 2, and where the symbol rate is in MHz, (Eq. 1) can be re-written as follows:

$$\text{Phase Step} = (\text{Nominal Symbol Rate}/186.667) * 0.250 * 2^{32}. \quad \text{(Eq. 3)}$$

For 8PSK modulation, whereas the modulation index is 3, and where the symbol rate is in MHz, (Eq. 1) can be re-written as follows:

$$\text{Phase Step} = (\text{Nominal Symbol Rate}/186.667) * 0.375 * 2^{32}. \quad \text{(Eq. 4)}$$

For 16PSK modulation, whereas the modulation index is 4, and where the symbol rate is in MHz, (Eq. 1) can be re-written as follows:

$$\text{Phase Step} = (\text{Nominal Symbol Rate}/186.667) * 0.500 * 2^{32}. \quad \text{(Eq. 5)}$$

For 32PSK modulation, whereas the modulation index is 5, and where the symbol rate is in MHz, (Eq. 1) can be re-written as follows:

$$\text{Phase Step} = (\text{Nominal Symbol Rate}/186.667) * 0.625 * 2^{32}. \quad \text{(Eq. 6)}$$

For 64PSK modulation, whereas the modulation index is 6, and where the symbol rate is in MHz, (Eq. 1) can be re-written as follows:

$$\text{Phase Step} = (\text{Nominal Symbol Rate}/186.667) * 0.750 * 2^{32}. \quad \text{(Eq. 7)}$$

For 128PSK modulation, whereas the modulation index is 7, and where the symbol rate is in MHz, (Eq. 1) can be re-written as follows:

$$\text{Phase Step} = (\text{Nominal Symbol Rate}/186.667) * 0.875 * 2^{32}. \quad \text{(Eq. 8)}$$

Finally, for 256PSK modulation, whereas the modulation index is 8, and where the symbol rate is in MHz, (Eq. 1) can be re-written as follows:

$$\text{Phase Step} = (\text{Nominal Symbol Rate}/186.667) * 1.000 * 2^{32}. \quad \text{(Eq. 9)}$$

If raw symbols are being output the 256QAM formula of (Eq. 9) should be used.

B. Limit Check

The limit check is the value that clips updates to the frequency offset register to ±Limit Check. The limit check is simply computed as the phase step multiplied by the maximum uncertainty allowed. Assuming the maximum uncertainty is $10^{-3}$, the limit check is computed as follows:

$$\text{Limit Check} = \text{Phase Step} * 10^{-3}, \quad \text{(Eq. 10)}$$

where, the phase step is given by (Eq. 1).

C. Error Scale.

The error scale is the value that is used to scale the phase detector curve based on baud rate. The error scale is computed as a ratio between the maximum symbol rate in use and the selected symbol rate. The scaling is performed as a power of 2 scaling. Since the maximum error value is set at +2047 in bit positions 31 through 20, it can scaled down by up to 31 right shifts with sign extension. The error value is related to the limit check so that the error value would not be a significant portion of the maximum frequency offset after scaling. Thus, the error value is damped considerably even at maximum error values. Assuming a damping factor $\beta$, the required scaling is computed as follows:

$$\text{Error\_Scale} = (2047 * 2^{20})/(\text{Limit\_Check} * \beta). \quad \text{(Eq. 11)}$$

To obtain the number of right shifts the Log 2 (Error_Scale) is taken and rounded up to the nearest integer.

D. Creating Limit Masks.

Once the limit check value is computed its absolute value is rounded to the nearest power of 2. Two masks values are created: the first positive test mask is configured to test positive limits, and the second negative test mask is configured to test negative limits.

More specifically, the first positive test mask comprises all 1's in the 32 bit register down to the power of 2 position for the limit. The bit positions after the power of 2 limit are all 0's. The first positive test mask is logically added (AND'd) to the next frequency offset value. The result is tested for all 0's.

More specifically, the second negative test mask comprises all 0's in the 32 bit register down to the power of 2 position for the limit. The bit positions after the power of 2 limit are all 1's. The second negative test mask is logically multiplied (OR'd) with the next frequency offset value. The result is tested for all 1's.

If neither test is true then the limit has been exceeded. The MSB of the next frequency offset determines whether the limit will be set negative or positive. If the sign is positive, the next frequency offset value is set to the positive value of the limit check. If the sign is negative, the next frequency offset value is set to the negative value of the limit check.

One aspect of the present invention is directed to a method for digital clock smoothing.

In one embodiment, the method of the present invention comprises (not shown): (A) inputting an asynchronous data stream having an asynchronous symbol rate into a two-port memory block; (B) accumulating a plurality of symbols of the asynchronous data stream in the two-port memory block for a predetermined time period long enough to accommodate the worst case burst and symbol offset; (C) computing an average symbol rate for the input asynchronous data stream; (D) generating a clock error signal equal to the difference between the average symbol rate of the input asynchronous data stream and a nominal output synchronous clock; (E) obtaining a smoothed symbol rate clock by using the error clock signal; and (F) generating an output smoothed data stream having the smoothed symbol rate clock.

In one embodiment, the method of the present invention comprises: (A) inputting an asynchronous data stream having an asynchronous symbol rate into a FIFO two-port memory block; (B) storing each input symbol in the FIFO under control of an input FIFO address control register; (C) obtaining a smoothed symbol rate; and (D) reading out each output symbol from the FIFO under control of an output FIFO address control register at the smoothed symbol rate.

In one embodiment of the present invention, the step (B) further comprises: (B1) obtaining the FIFO depth B by subtracting modulo B the symbol output address from the symbol input address for each stored symbol; (B2) inputting the FIFO depth B into a programmable look-up table (LUT); (B3)

obtaining a phase detector error signal; (B4) scaling the phase detector error signal in order to obtain a scaled error factor, wherein the scaled error factor is normalized by using a set of parameters selected from the group consisting of: {a ratio of the input symbol rate to the reference clock; and a damping factor configured to compensate for latency of the frequency lock loop (FLL)}; and (B5) adding the scaled error factor to a nominal phase step to obtain a phase update.

In one embodiment of the present invention, the step (B1) further comprises: (B1, 1) gray-coding an output FIFO read address; (B1, 2) synchronizing an output count for each FIFO read-out symbol from the gray-coded output FIFO read address with the input asynchronous clock; (B1, 3) inversely gray-coding the synchronized gray-coded output FIFO read address; and (B1, 4) obtaining a current FIFO depth by subtracting by modulo B the synchronized output FIFO read address obtained in the step (B1, 3) from the current input FIFO write address. B comprises FIFO depth.

In one embodiment of the present invention, the step (B2) further comprises: (B2, 1) programming the LUT by using a set of parameters selected from the group consisting of: {an error limit; and a hysteresis}.

In one embodiment of the present invention, the step (B3) further comprises: (B3, 1) programming the phase detector by installing the programmable LUT.

In one embodiment of the present invention, the step (C) further comprises: (C1) multiplying the phase update by factor i/N by using an N stage wide phase accumulator; wherein the N stage wide phase accumulator is configured to output a set of N phase updates; i being an integer less or equal to N; N being an integer; (C2) applying each i-th phase update to i-th cosine look-up table (COS_LUT); wherein an N-stage cosine look-up table (N_COS_LUT) is configured to generate a set of N phase outputs; and (C3) applying each N phase output generated by the N-stage cosine look-up table (N_COS_LUT) to a Digital-to-Analog Converter (DAC); wherein the DAC is configured to generate a plurality of uniformly spread time epochs including a plurality of odd time epochs and a plurality of even time epochs; N being a ratio of the DAC sampling clock and the clock smoothing rate.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents

What is claimed is:

1. A method for digital clock smoothing comprising:
   (A) inputting an asynchronous data stream having an asynchronous symbol rate into a FIFO two-port memory block;
   (B1) obtaining said FIFO depth B by subtracting modulo B for each said stored symbol said symbol output address from said symbol input address;
   (B2) inputting said FIFO depth B into a programmable LUT;
   (B3) obtaining a phase detector error signal;
   (B4) scaling said phase detector error signal to obtain a scaled error factor, wherein said scaled error factor is normalized by using a set of parameters selected from the group consisting of: {a ratio of said input symbol rate to said reference clock; and a damping factor configured to compensate for latency of said frequency lock loop (FLL)};
   (B5) adding said scaled error factor to a nominal phase step to obtain a phase update;
   (C) obtaining a smoothed symbol rate; and
   (D) reading out each output symbol from said FIFO under control of an output FIFO address control register at said smoothed symbol rate.

2. The method of claim 1, wherein said step (B1) further comprises:
   (B1, 1) gray-coding an output FIFO read address;
   (B1,2) synchronizing an output count for each FIFO read-out symbol from said gray-coded output FIFO read address with said input asynchronous clock;
   (B1, 3) inversely gray-coding said synchronized gray-coded output FIFO read address; and
   (B1,4) obtaining a current FIFO depth by subtracting by modulo B said synchronized output FIFO read address obtained in said step (B1,3) from the current input FIFO write address; wherein B comprises said FIFO depth.

3. The method of claim 1, wherein said step (B2) further comprises:
   (B2, 1) programming said LUT by using a set of parameters selected from the group consisting of: {an error limit; and a hysteresis}.

4. The method of claim 1, wherein said step (B3) further comprises:
   (B3, 1) programming said phase detector by installing said programmable LUT.

5. The method of claim 1, wherein said step (C) further comprises:
   (C1) multiplying said phase update by factor i/N by using an N stage wide phase accumulator; wherein said N stage wide phase accumulator is configured to output a set of N phase updates; i being an integer less or equal to N; N being an integer;
   (C2) applying each said i-th phase update to i-th cosine look-up table (COS_LUT); wherein an N-stage cosine look-up table (N_COS_LUT) is configured to generate a set of N phase outputs; and
   (C3) applying each said N phase output generated by said N-stage cosine look-up table (N_COS_LUT) to a Digital-to-Analog Converter (DAC); wherein said DAC is configured to generate a plurality of uniformly spread time epochs including a plurality of odd time epochs and a plurality of even time epochs; N being a ratio of said DAC sampling clock and said clock smoothing rate.

6. An apparatus for digital clock smoothing comprising:
   (A1) a FIFO means configured to input said asynchronous data stream having an asynchronous symbol rate;
   (B1) a means for obtaining said FIFO depth B by subtracting modulo B for each said stored symbol said symbol output address from said symbol input address;
   (B2) a programmable LUT configured to input said FIFO depth B;
   (B3) a phase detector configured to obtain a phase detector error signal;
   (B4) a means for scaling said phase detector error signal to obtain a scaled error factor, wherein said scaled error factor is normalized by using a set of parameters selected from the group consisting of: {a ratio of said input symbol rate to said reference clock; and a damping factor configured to compensate for latency of said frequency lock loop (FLL)};

(B5) a means for adding said scaled error factor to a nominal phase step to obtain a phase update;

(C) a means for obtaining a smoothed symbol rate; and (D) a means for outputting each symbol at said smoothed symbol rate.

7. The apparatus of claim 6, wherein said means (B1) further comprises:
(B1, 1) a means for gray-coding an output FIFO read address;
(B1, 2) a means for synchronizing an output count for each FIFO read-out symbol from said gray-coded output FIFO read address with said input asynchronous clock;
(B1, 3) a means for inversely gray-coding said synchronized gray-coded output FIFO read address; and
(B1, 4) a means for subtracting by modulo B said synchronized output FIFO read address obtained in said step (B1, 3) from the current input FIFO write address to obtain a current FIFO depth; wherein B comprises said FIFO depth.

8. The apparatus of claim 7, wherein said means (B1, 1) further comprises:
(B1, 1, 1) a first gray-coding LUT configured to gray-code said output FIFO read address.

9. The apparatus of claim 7, wherein said means (B1, 2) further comprises:
(B1, 2, 1) a serial Flip-Flops operated by said input asynchronous input clock signal, wherein said serial Flip-Flops is configured to synchronize said output count for each FIFO read-out symbol from said gray-coded output FIFO read address with said input asynchronous clock.

10. The apparatus of claim 7, wherein said means (B1, 3) further comprises:
(B1, 3, 1) a second gray-coding LUT configured to inversely gray-code said synchronized gray-coded output FIFO read address.

11. The apparatus of claim 6, wherein said means (B2) further comprises:
(B2, 1) a means for programming said LUT by using a set of parameters selected from the group consisting of: {an error limit; and a hysteresis}.

12. The apparatus of claim 6, wherein said means (B3) further comprises:
(B3, 1) a means for programming said phase detector by installing said programmable LUT.

13. The apparatus of claim 6, wherein said means (B4) further comprises:
(B4, 1) a scale value register configured to determine a scale factor; and
(B4, 2) a scale error register configured to scale said phase detector error signal by using said scale factor to obtain a scaled error factor.

14. The apparatus of claim 6, wherein said means (B5) further comprises:
(B5, 1) an adder configured to add said scaled error factor to said nominal phase step to obtain said phase update.

15. The apparatus of claim 6, wherein said means (C) for obtaining said smoothed symbol rate further comprises:
(C1) a means for multiplying said phase update by factor i/N by using an N stage wide phase accumulator; wherein said N stage wide phase accumulator is configured to output a set of N phase updates; i being an integer less or equal to N; N being an integer;
(C2) a means for applying each said i-th phase update to i-th cosine look-up table (COS_LUT); wherein an N-stage cosine look-up table (N_COS_LUT) is configured to generate a set of N phase outputs; and
(C3) a means for applying each said N phase output generated by said N-stage cosine look-up table (N_COS_LUT) to a Digital-to-Analog Converter (DAC); wherein said DAC is configured to generate a plurality of uniformly spread time epochs including a plurality of odd time epochs and a plurality of even time epochs; N being a ratio of said DAC sampling clock and said clock smoothing rate.

* * * * *